United States Patent [19]
Gage

[11] 3,792,517
[45] Feb. 19, 1974

[54] ROTARY MACHINE CUTTING TOOLS
[75] Inventor: Homer D. Gage, Meadville, Pa.
[73] Assignee: McCrosky Tool Corporation, Meadville, Pa.
[22] Filed: Aug. 17, 1971
[21] Appl. No.: 172,487

[52] U.S. Cl. .................................. 29/105, 29/96
[51] Int. Cl. .............................................. B26d 1/12
[58] Field of Search 29/105; 85/62, 32 CS; 408/153

[56] References Cited
UNITED STATES PATENTS

| | | | |
|---|---|---|---|
| 3,574,251 | 4/1971 | Corti | 29/105 |
| 3,083,442 | 4/1963 | Almen | 29/105 |
| 3,611,527 | 10/1971 | Hudson | 29/105 X |
| 2,968,859 | 1/1961 | Garnett | 29/105 |
| 2,706,848 | 4/1955 | Riley | 29/105 |
| 1,089,527 | 3/1914 | Bolton | 29/105 |
| 2,775,821 | 1/1957 | Eipper et al. | 408/153 X |
| 2,537,274 | 1/1951 | LeMay | 29/96 X |
| 3,121,453 | 2/1964 | Modrey | 85/32 CS X |
| 3,499,198 | 2/1970 | Pollard et al. | 29/105 |

Primary Examiner—Andrew R. Juhasz
Assistant Examiner—Leon Gilden
Attorney, Agent, or Firm—Samuel Lebowitz

[57] ABSTRACT

A rotary machine cutting tool, such as a milling cutter, with a cutter head having a plurality of axially extending slots distributed around the periphery thereof adapted to receive flat indexable cutters of heavy duty machining alloys, which are adapted to be clamped herein with a uniform protrusion beyond the cutter head to distribute the cutting load uniformly between the several cutters. In order to compensate for any longitudinal variations in the positioning of the cutters fitted therein, rugged adjustable support for each cutter is provided at each slot comprising an angularly disposed threaded bolt having a supporting head at its outer end and a shank on the opposite inner end fitted within a threaded bore against a sufficiently strong resistance to retain the threaded bolt in its set position and with sufficient stability to withstand vibration and other stresses incident to the machining operation. The rotary adjustment of the bolt results in a comparatively slight translatory movement of the bolt head to critically vary the level of the support of the cutting insert to a tolerance of as little as 0.0001. The frictional drag to the movement of the adjusting bolts may be imposed by springs of any type, for example, Belleville springs, between the threaded bore and bolt head, or by resilient locking threads between the threaded bore and the threaded shank of the bolt. The invention is also applicable to other rotary machine cutting tools such as boring heads.

10 Claims, 6 Drawing Figures

PATENTED FEB 19 1974 3,792,517
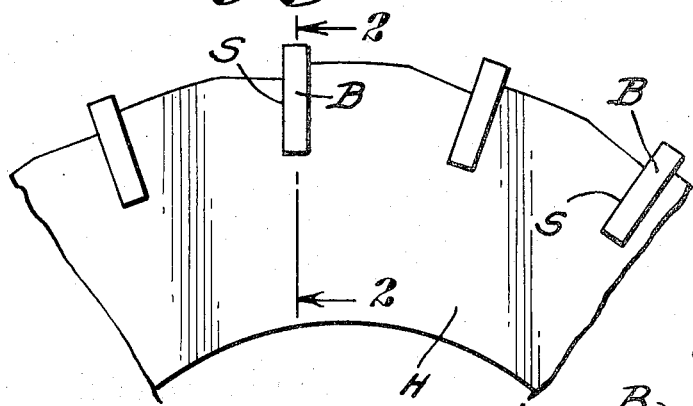
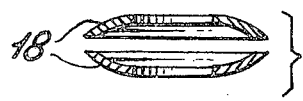
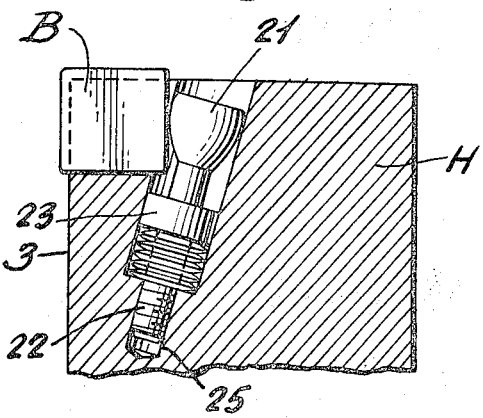
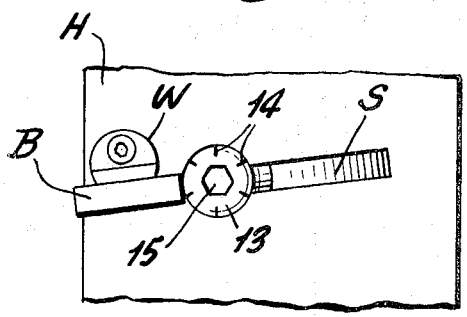
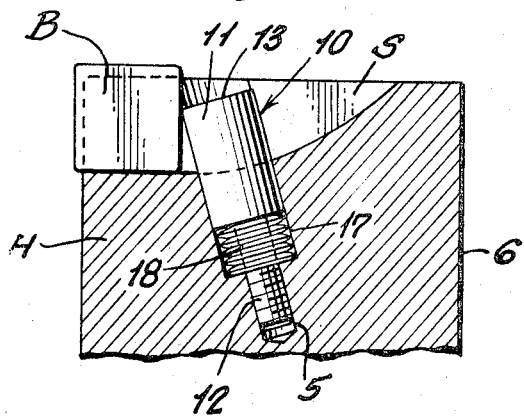
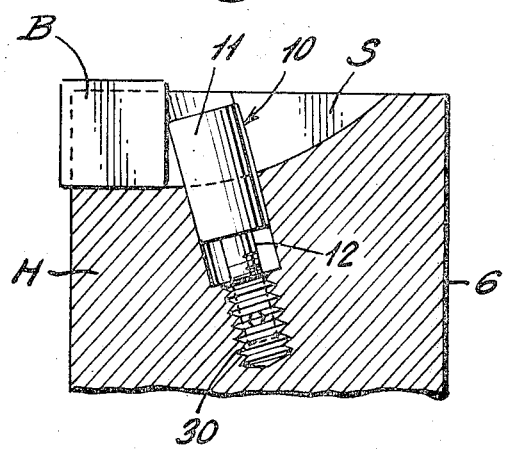
INVENTOR
HOMER D. GAGE
BY
ATTORNEY

ROTARY MACHINE CUTTING TOOLS

This invention relates to rotary machine cutting tools such as milling cutters, and particularly machine tools provided with cutter heads fitted with radial slots in the periphery thereof for receiving flat indexable cutters for clamping therein in critical alignment, so that machining operations therewith may be executed efficiently and expeditiously.

It is the object of the present invention to provide milling cutters with radial slots therein for receiving indexable flat cutting bits provided with multiple cutting edges which are adapted to be clamped securely within the slots and which may be adjusted quickly and accurately to dispose the cutting edges of the respective bits in a common plane for the cutting operation.

It is another object of the invention to provide for an accurate adjustment of the longitudinal and radial positions of indexable cutters preparatory to the clamping thereof in adjusted position, in a manner to provide rugged supports for the adjustable cutters which are not influenced by the vibrations occasioned during the maching operation. This is made possible by mounting a variably positioned abutment at each slot of the cutter head adjacent to each indexable cutter bit, which abutment is capable of movement in an amount more than ample to compensate for any variations in the dimensions of the cutter bits and/or the radial slots of the cutter body.

It is a further object of the invention to provide adjusting devices of low cost, for affording reliable supports for indexable cutters and which are capable of easy manipulation to attain the desired results. These present a marked simplification over the adjusting arrangements for indexable blades in milling cutters as exemplified by the arrangements disclosed in U.S. Pat. Nos. 3,378,901, Apr. 23, 1968, and 3,205,559, Sept. 14, 1965.

Other objects and purposes will appear from the detailed description of the invention following hereinafter, taken in conjunction with the accompanying drawings, wherein;

FIG. 1 is an end view of a milling cutter to which the instant invention is applied;

FIG. 2 is a vertical sectional view along line 2—2 of FIG. 1;

FIG. 3 is a plan view of FIG. 2;

FIG. 4 is an enlarged sectional view of one of the Belleville spring units shown in FIG. 2;

FIG. 5 is a vertical sectional view similar to FIG. 2 of another embodiment of the invention; and FIG. 6 is a vertical sectional view similar to FIG. 2, of a variant embodiment from that shown in FIG. 2.

In the drawings is shown a milling cutter having a cutter head H provided with a plurality of radial slots S distributed around the periphery thereof, in which are adapted to be inserted flat cutters B fabricated of special alloys and which are ground with multiple cutting edges. These are adapted to be positioned within the slots S interchangeably, to utilize the cutting edges successively after these are worn, by the cutting operations, before they are discarded or re-ground.

It is important that the cutting action amongst the several cutters be distributed uniformly, and to that end, the longitudinal positioning of the insertable cutters within the cutter head is critical. Longitudinal adjustment of the cutting edges of the indexable cutter bits is desirable, and such may be effected to tolerances within 0.0001 inch of a common plane with the use of calibrating instruments known in the art. Once the indexable bits are positioned accurately, they are securely clamped in adjusted position by blade locking wedges W, seated in sockets adjacent to the slots, which are well known in the art.

The instant invention provides a simple and reliable adjustment for the accurate positioning of the flat cutter bits by providing a threaded bolt at each of the slots which is adapted to engage a bore in the cutter head which is inclined to the longitudinal axis of the latter so that each headed bolt, when it is rotated in its bore, experiences a component of movement parallel to the longitudinal axis of the cutter head. The head of the bolt is in abutting engagement with an edge of the cutter remote from the effective cutting edge to support the cutter and to position it accurately. Thus, the angular rotation of the bolt is transformed into a rectilinear translating movement of the abutment for the cutter, which is sufficient to position the cutting edges of all the cutters uniformly in a common plane beyond the exposed faces of the cutter head. Of course, it is important that the rotary movements of the adjusting bolts and the consequent shifts of the abutment points on the heads be maintained securely once the adjustments are executed, and to this end the invention employs different means for imposing a frictional resistive force against unintentional movements.

Thus, as shown in FIGS. 2 and 3, the threaded bolt 10, having a cylindrical head 11, with the threaded shank 12, engages the threaded bore 5 within the cutter head at an inclination to the longitudinal axis of the head, which inclination may range from 70° to 80°. The cylindrical chamber 17 in the cutter head adjacent to the threaded bore 5, is enlarged to accommodate one or several sets of Belleville springs 18, so that any rotary movement of the head 11 which controls the point of abutment of the outer end of the lateral wall of the head, remains in adjusted position. The frictional force of the Belleville springs, in conjunction with the wedge clamp W on one side of the slot S, serve to fix the position of the indexable cutter, which remains securely in its adjusted position despite the stresses and vibrations of the cutting operation.

The exposed face 13 of the head of the bolt 10 may be provided with radial graduations 14 so that the rotary movements of the bolt relative to the cutter B may be seen easily in the course of rotating the bolt, which in turn gives rise to the translating movement of the supporting abutment for the indexable cutter.

While FIG. 3 shows a hexagonal recess 15 in the head 13 of the bolt 10, to accommodate an Allen wrench, for the purpose of rotating the bolt, a simple rectilinear kerf for receiving a screw-driver, may be used for such purpose.

The arrangement shown in FIG. 2 utilizes the circular junction of the lateral wall and the face 13 of the bolt head 11 to provide the variable point of abutment for the cutter bit. This requires that the bore 5 be directed in a direction towards the inner face 6 of the cutter head. A sharp right angle between the face 13 and lateral wall of the bolt head, as shown in FIG. 3, results in a point support for the cutter B. A line support for the cutter may be attained by providing a beveled surface between the surface 13 and the lateral wall of the bolt head. The beveled or chamfered surface should be at an angle corresponding to the inclination of the abutment in order to attain a line bearing with the bit.

In FIG. 5, the bore 25 is shown directed at an inclination to the longitudinal axis of the cutter head in a direction towards the outer face 3 of the cutter head. In this case, the head of the bolt is subdivided into two parts, 21 and 23. The outer portion 21 is formed with the lateral wall having a convex contour so that the translating movements of the head provide an adjustable support for the cutter at an intermediate point of the lateral wall. The base 23 of the bolt head cooperates with the multiple sets of Belleville springs which surround the shank 22 which is in rotatable engagement with the threaded bore 25.

The convexly contoured bolt head 21 may be provided with radial graduations 14, similarly to that shown in FIG. 3, and may be fitted with either a hexagonal recess or a kerf for enabling the bolt to be rotated in the course of making the necessary adjustments.

Any known means for providing a frictional force against the inadvertent rotation of the adjusting bolts may be used in conjunction therewith. In the embodiment shown in FIG. 6, the threaded bore is adapted to be fitted with a threaded insert 30 which presents a resilient locking action against inadvertent movements of a threaded bolt. Such devices are known in the art under the designation of "Heli-Coil" screw thread inserts. Such a screw-threaded insert may be used in lieu of the Belleville springs employed in the embodiments described above.

The adjustable abutment for indexable cutters afforded by the rotary bolts, as disclosed herein, may be applied to all types of machine cutting tools, for example, boring heads. Furthermore, these adjustable abutments may be used on such tools in which the cutters are not distributed equidistantly around the cutter head.

I claim:

1. A rotary machine cutting tool comprising
   a. a head provided with a plurality of recesses distributed around the periphery thereof, each comprising a slot formed of a fixed planar surface and a movable planar surface displaced therefrom for accommodating an indexable flat cutting bit having multiple cutting edges, between said planar surfaces,
   b. wedging means for ultimately actuating said movable planar surface to clamp said flat cutting bit in any initially set adjusted position between said fixed and movable surfaces, said adjusted position adapted to present at least one cutting edge of each bit in a common plane and at a substantially uniform radial distance from the longitudinal axis of said head,
   c. a threaded bore in said head communicating with each recess and extending interiorly therefrom at an inclination to said longitudinal axis,
   d. a bolt having a threaded shank at the inner end thereof in engagement with said threaded bore, and a head at the outer end thereof adjacent to the inner end of said slot, said head adapted to engage and support the bit at an external edge thereof remote from the cutting edge of said bit, and
   e. means for rotatably adjusting said bolt to vary the component of the motion thereof along a line parallel to said longitudinal axis and thereby to vary the point of support offered thereby to said indexable bit, to set said bit in said adjusted position, preparatory to the clamping of the bit in said position by said wedging means.

2. A device as set forth in claim 1, including resistance means between said threaded bore and bolt for interposing a frictional force in opposition to the rotary force applied to said bolt for varying the position thereof.

3. A device as set forth in claim 2, wherein said head is provided with a cylindrical chamber of enlarged diameter externally of said threaded bore, and spring means within said chamber for exerting an outward force against the head of said bolt in opposition to inward movement of said bolt.

4. A device as set forth in claim 3, wherein said spring means comprises at least one set of Belleville springs surrounding said bolt between the inner end of said head and said threaded bore.

5. A device as set forth in claim 2, wherein said head is of cylindrical outline with the outer peripheral edge thereof in abutting contact with the edge of said cutting bit remote from said cutting edge.

6. A device as set forth in claim 2, wherein the outer face of the head of said bolt is provided with multiple radial markings to render more visible the extent of the rotary movement imparted to said bolt to vary the longitudinal position thereof in increments as small as 0.0001 inch.

7. A device as set forth in claim 2, wherein the lateral wall of the head of said bolt is rounded convexly for providing an abutting contact with the remote edge of said cutting bit at an intermediate point on the lateral wall of said head.

8. A device as set forth in claim 7, wherein said threaded bore extends interiorly in a direction towards the outer face of said cutter head.

9. A device as set forth in claim 5, wherein said threaded bore extends interiorly in a direction outwardly from the outer face of said cutter head.

10. A device as set forth in claim 2, wherein said resistance means comprises a hollow threaded insert adapted to be threaded into said bore for threaded engagement with the advancing shank of said bolt.

* * * * *